United States Patent [19]

Anderson et al.

[11] Patent Number: 4,968,001

[45] Date of Patent: Nov. 6, 1990

[54] MULTI-ELEMENT, BI-DIRECTIONAL VALVE SEAT

[76] Inventors: Vaughn R. Anderson, 217 N. 260 W., Orem, Utah 84057; Robert E. Gooch, 960 E. 1000 South, Spanish Fork, Utah 84660

[21] Appl. No.: 467,311

[22] Filed: Jan. 17, 1990

Related U.S. Application Data

[63] Continuation of Ser. No. 362,616, Jun. 6, 1989, abandoned, which is a continuation of Ser. No. 124,482, Nov. 23, 1987, abandoned.

[51] Int. Cl.$^5$ ................................................. F16K 5/06
[52] U.S. Cl. ..................................... 251/175; 251/172
[58] Field of Search ......................... 251/172, 173, 175

[56] References Cited

U.S. PATENT DOCUMENTS

| | | | |
|---|---|---|---|
| 3,252,684 | 5/1966 | Ksieski | 251/172 |
| 3,841,347 | 10/1974 | Kushida | 251/172 X |
| 4,231,546 | 11/1980 | Eggleston et al. | 251/173 |
| 4,410,165 | 10/1983 | Koch et al. | 251/172 X |
| 4,491,298 | 1/1985 | Beauchamp et al. | 251/173 X |
| 4,502,663 | 3/1985 | Huber | 251/315 X |

Primary Examiner—John C. Fox

[57] ABSTRACT

In a bi-directional valve control system, a differential, bi-directional valve seating member for operation at a seating surface wherein the seating member comprises a multi-membered disk formed of at least first and second contiguous disk elements. The first disk element is formed of flexible material which is capable of primary deformation in response to fluid flow along a flow line direction corresponding to second-to-first disk orientation. This first disk element is configured in size and shape to increase seating contact at the seating surface by flow-pressure assist principles which cause the primary deformation response. The second disk element is formed of flexible material which when combined with the first disk element is less capable of deforming than the independent deformation first disk element. This second disk element resists the primary deformation response with respect to fluid flow along the opposing flow line from first-to-second disk element orientation. The resistance against primary deformation of the first disk element provides enhanced seating contact by pressure assist principles.

11 Claims, 2 Drawing Sheets

MULTI-ELEMENT, BI-DIRECTIONAL VALVE SEAT

This is continuation of Ser. No. 07/362,616, filed June 6, 1989 now abandoned, which was a continuation of Ser. No. 07/124,482, filed Nov. 23, 1987 also now abandoned.

BACKGROUND OF THE INVENTION

1. Field of Invention

This invention relates to valve seat structures which are operable to block fluid flow along both opposing directions and a flow line. More specifically, the present invention relates to a bi-directional valve seat which experiences enhanced seal in response to flow pressure occurring within the valve.

2. Prior Art

Many valve seat designs have been developed to enable bi-directional flow within a valve operated flow line. The significance of pressure-assisted valve control is that as flow line pressure increases, the sealing contact between the seating member and blocking member which is usually rotated across the flow line also increases. The result is an improved sealing contact which increases with the increasing pressure of the blocked fluid. Accordingly, the stronger the pressure and effort of the fluid to by-pass the valve, the greater is the resistance to valve failure or loss of sealing contact.

One problem which is typically inherent in each valve design is the slight displacement of the blocking member within the flow line as it encounters the immediate pressure buildup of blocked fluid. This displacement of the blocking member naturally follows the flow line of fluid. Even with delicate engineering to minimum tolerances, there is typically some displacement of the blocking member with the initial surge of fluid thereagainst.

In view of the difficulty of designing a bi-directional valve which responds along both directions of displacement of the blocking member, many valve designs have arisen. These are generally characterized by complex geometries for the seating member or sealing member (referred to hereafter as "seating member"), as well as complex construction. Such complexity in high pressure valve systems not only increases expense, but generates higher risk of failure because of failure of the actual valve to meet the complex specification in every instance of manufacture. In other words, commercial development of such valve designs may easily fall below the engineered design criteria because of difficulty of manufacture.

OBJECTS AND SUMMARY OF THE INVENTION

It is therefore an object of the present invention to provide a valve seat design which operates in bi-directional manner with pressure assist to improve seating action.

It is a further object of this invention to provide a simple seating member design which responds with pressure assist sealing despite the displacement of the seating member in response to pressure from blocked fluid.

It is a specific objective of this invention to provide a bi-directional seating member which utilizes stiffness of the sealing member to enhance the seal in one flow direction, and the flexibility of the sealing member to enhance the seal in the other flow direction.

Other objects and features of the present invention will be apparent to those skilled in the art when viewed with respect to the following detailed description, taken in combination with the drawings.

DETAILED DESCRIPTION OF THE INVENTION

Figure 1:
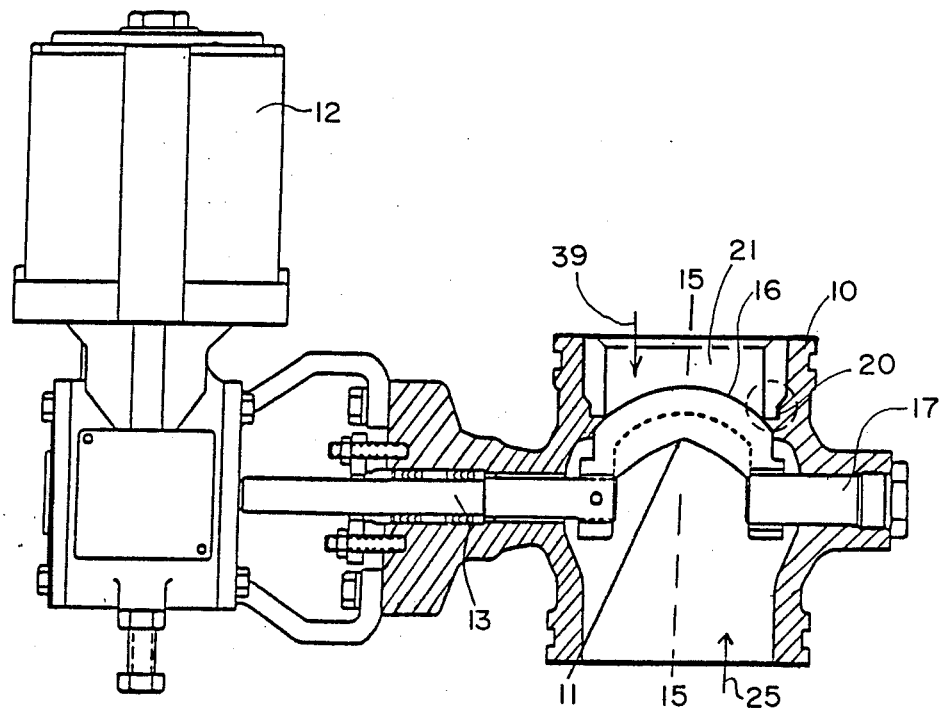
FIG. 1 shows a segmented ball valve utilizing the improved valve seating device of the present invention.

FIG. 1 shows a typical valve and control system as manufactured by Valtek Incorporated of Springville, Utah. It includes a valve housing 10 which contains a blocking member 11. The blocking member is controlled by a pneumatic actuator 12 which is coupled to the blocking member by rotatable shaft 13. The blocking member 11 is shown in its blocking configuration across flow line 15. This axis represents the direction of fluid flow through valve housing 10. Such fluid flow may occur along either direction of this flow axis 15.

The illustrated blocking member 11 is generally referred to as a ball closure member in view of its spherical curvature across the seating surface 16. The specific configuration is referred to as a V-notch segmented ball. It is supported at its other axis by a trunnion or shaft 17. The powered shaft 13 rotates the ball 11 upon command from the actuator 12. By rotation of 90 degrees, the blocking member 11 is displaced out of the flow line, permitting fluid flow to pass along the flow axis 15. It will be apparent that other blocking configurations may also be used, such as conventional disk shapes. Each such structure includes a convex seating surface 16 which has a substantially symmetrical axis. This symmetrical axis is a line parallel with the flow axis 15 and is maintained by means of the shaft 13, powered by the actuator.

Flow through the housing will be defined herein as coming from one of two directions. Fluid flow from the blocking side means that flow passes from the blocking member 11 toward the seating member 20 which is an annular ring which is mounted within the housing 10 at a peripheral location. This direction of flow is represented in FIG. 2.

In contrast, flow from the open side constitutes the condition wherein fluid flow passes from the open channel 21 and toward the blocking member with seating surface 16 and sealing member 20. FIG. 3 illustrates open side flow.

Figures 2, 3:
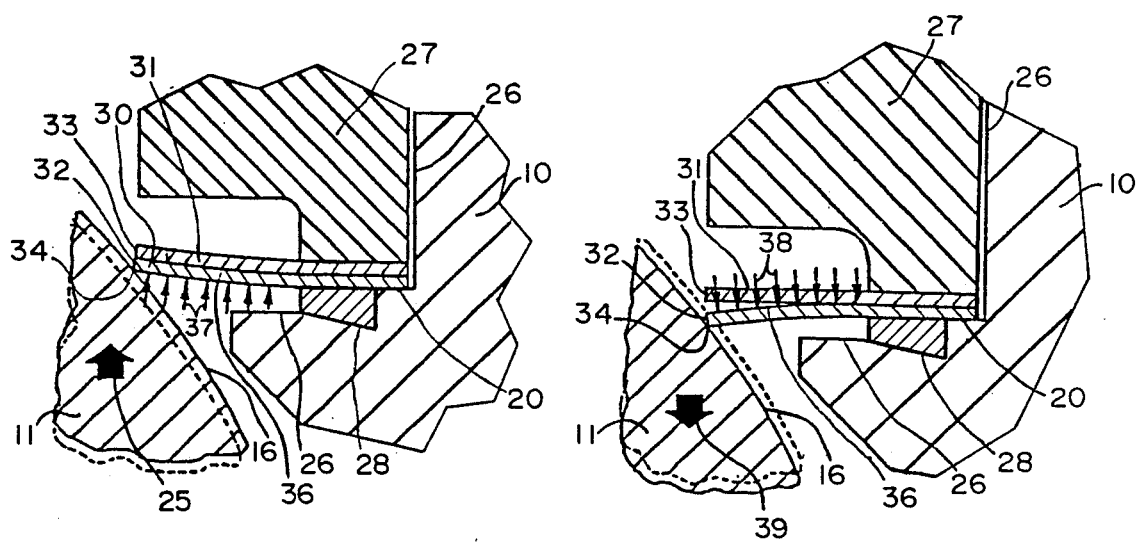
FIG. 2 is a graphic representation of the cross section taken radially across the seating member as it operates with respect to the blocking member.
FIG. 3 shows the same graphic cross section with fluid flow originating along an opposing flow line as compared to the flow line of FIG. 2.

The operable part of this invention is shown in FIGS. 2 and 3. FIG. 2 shows fluid flow 25 moving from the right side of the drawing. In terms of the previous definition, this would be referred to as flow from the blocking side within the valve housing. This corresponds to flow arrow 25 in FIG. 1. This figure shows an enlarged view of item 20 of FIG. 1, which comprises the sealing member structure 20 which operates against the seating surface 16 of the blocking member 11. This sealing member is retained within mounting channels 26 within the housing 10 by means of a retainer 27 on one side and gasket 28 on the other. The sealing member comprises first 30 and second 31 annular disk shaped elements each having interior perimeters, 32 and 33 respectively, defining annular openings which permit the blocking member 11 to pass therethrough.

The first disk element 30 is constructed of flexible material and has a seating side 34 of its interior perimeter 32 appropriately configured in size to seat against the convex seating surface 16 of the blocking member 11 when in a closed position. For example, the first disk element shown in the drawings is fabricated with 316 stainless steel which is responsive within the temperature range of −450 degrees F. to 1200 degrees F. The degree of flexibility of the first element is developed by selecting the appropriate thickness. In the present embodiment, the thickness is approximately equal to 0.016 inches. Alternative compositions for the disk elements in addition to alloys include austenitic, ferritic, martensitic and other specialty stainless steels as well as nonferrous metals. Typically, the range of thickness for such materials will vary from 0.010 to 0.040 inches.

The first disk element 30 is reinforced along the flow direction 25 by the second disk element 31 which is in direct contact with a non-seating side 36 of the first disk element. This second disk element is constructed with sufficient size and rigidity to support the first disk element against flexing away from sealing contact with the blocking member in response to fluid flow forces 37 which are developed at the contacting side of the first element. For example, the illustrated embodiment of the second disk element is also constructed of 316 stainless steel and has a thickness of approximately 0.016 inches. Its size conforms substantially to the size of the first disk element. It will be apparent that the annular opening defined by perimeter 33 should not extend to the annular opening occupied by the blocking member in the closed position. In the present embodiment using a ball valve configuration with the ball structure having a substantially spherical surface, these annular openings have a circular configuration as defined by the interior perimeter 32.

Operation of the embodiment illustrated in FIG. 2 is as follows. As the ball valve is rotated to a closed position, it encounters the seating member 20 at the seating surface 16. An initial sealing contact develops at perimeter edge 34 which immediately causes the differential pressure across the disk member and the blocking member to g build up. The increased pressure at the blocking member or ball 11 causes the blocking member to laterally displace, as shown from the shift in position of the blocking member from an initial phantom line position.

FIG. 3 illustrates the effect of fluid pressure and flow from the opposing or open side of the valve. Whereas the flow direction 25 in FIG. 2 causes the respective first and second disk elements to cooperate and work together for pressure assisted sealing, this same pair of disk members work independently with flow from the open side as represented by arrow 39. In this instance, flow from the open side causes the opposite displacement of blocking member 11. This is again shown by displacement of the blocking member from the original closed position immediately prior to pressure buildup of fluid pressure 38. This initial position is again shown in phantom line. With the displacement of the ball valve 11 resultant to the differential fluid pressure 38, the first disk element 30 follows the ball and maintains sealing contact 34 with the seating surface 16. Accordingly, it is important that the first disk member 30 has sufficient flexibility to permit its interior perimeter 32 to deflect, due to the differential pressure across it, toward the seating surface 16 of the blocking member and away from the second disk element 31. Any further increase in differential pressure 38 operates to enhance the seal 34. The second disk element 31 simply retains its place as shown in FIG. 3.

In summary, therefore, the present invention provides differing responses to develop the required pressure assisted sealing response. With respect to open side fluid flow, sealing contact of the first disk element with the seating surface is based on deflection of the first disk element toward the seating surface and away from the second disk element. In contrast, flow from the blocking side is operable to enhance sealing contact by prevention of significant deflection of the first element, based on the increased stiffness of the two seal elements working in tandem. This contrasting response is made possible by use of a multi-membered disk element configuration having at least first and second contiguous disk elements as previously explained. The first disk element is formed of flexible material which is capable of primary deformation in response to the fluid flow along the flow line direction corresponding to second-to-first disk orientation. Enhanced seating contact by pressure assistance from the flow line is the by-product of this primary deformation response.

On the other hand, the second disk element is formed of a similar material which when combined with the first disk sealing element produces an overall effect which is less capable of deforming than the first disk element acting independently. Therefore, as blocking side flow occurs, the multi-membered disk resists primary deformation which occurred in the first instance. With this opposing flow from first-to-second disk element orientation, the sealing contact is enhanced by reason of limited displacement of the seating surface 16 toward the multi-disk member, with its counter force applied primarily by the dependent operation of the disk elements. Accordingly, the present invention produces a differential response with the same multi-disk seating member.

Figure 4:
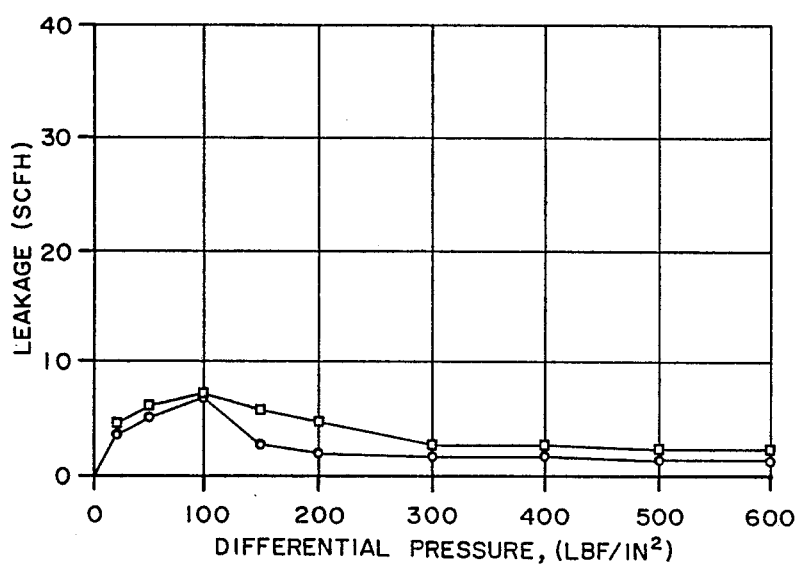
FIG. 4 is a graph showing actual improved results based on decreased leakage versus differential pressure in the flow line.

FIG. 4 illustrates the effective pressure-assist operation of this bi-directional valve. Line 40 illustrates the decrease in leakage which occurs with increased pressure in the flow line with flow from the open side of the valve. Line 41 illustrates a similar increase in sealing contact for flow from the blocking side of the valve. The stability of the present valve configuration for bi-directional flow is illustrated in the 300–600 LBS/inches squared range.

Figure 5:
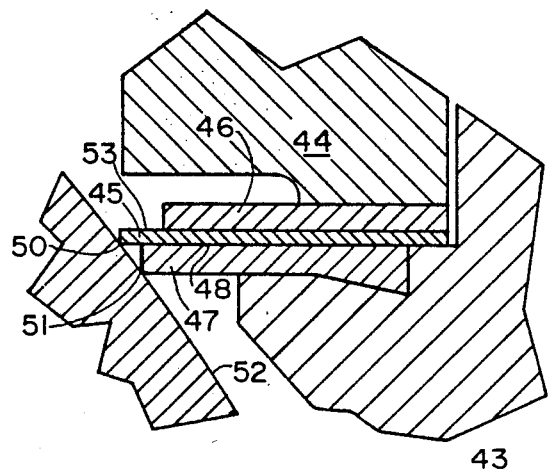
FIG. 5 illustrates an alternate embodiment showing the present invention in combination with a conventional soft seat member.

It is apparent that the basic multi-disk seating member may be applied within alternate configurations from those disclosed herein. For example, FIG. 5 shows an additional bi-directional valve system having a valve housing 43 and retainer 44 for securing a multi-element seating member with first 44 and second 46 disk elements, and further including a soft seat element 47. This soft seating member comprises an annular body which is positioned against the seating side 48 of the first disk element and toward flow orientation from the blocking side of the valve housing. The soft seating member 47 should have sufficient flexibility to permit the first disk element to deflect in response to flow from the open channel side, maintaining sealing contacts at both perimeters 50 and 51.

Flow from the opposing direction would operate in a manner similar to that described in FIG. 2. The actual amount of resistance required to prevent the soft seating member and/or first disk element from deflecting away from the seating surface 52 will obviously depend on selection of materials. In FIG. 5, a more rigid (and thicker) second disk element is shown. Because of greater stiffness, the length of this second disk element at the non-seating side 53 of the first disk element is somewhat lessened. In this case, approximately 75% of the non-seating side 53 is in direct contact with and supported by the second disk element. Depending upon the selection of materials and thickness for the second disk element, this percentage of non-seating side in direct contact with the second disk element may range from 50% to 100%.

Figure 6:
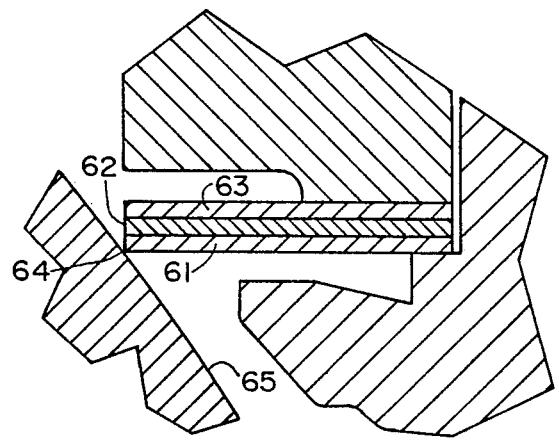
FIG. 6 illustrates an alternate embodiment showing the present invention utilizing three sealing members.

Other variations from the disclosed embodiments will likewise be apparent to those skilled in the art. For example, FIG. 6 illustrates a configuration having three disk elements 61, 62 & 63. The first element 61 provides the primary sealing contact at 64 with respect to the ball 65. Elements 62 and 63 operate as stiffening elements to support element 61 from flow in right-to-left orientation. Accordingly, the present disclosure is not to be deemed limiting, except as set forth in the following claims.

We claim:

1. A bi-directional valve including (i) a valve housing, (ii) a flow channel defining an axial flow path therethrough, (iii) an annular seating member and (iv) a moveable blocking member displaceable within the flow channel for selectively blocking or passing fluid flow through the valve, said blocking member including a convex seating surface having a substantially symmetrical axis and further including means for aligning the symmetrical axis with the axial fluid flow path when engaging the annular seating member to seal the flow channel against fluid flow, said valve being capable of blocking fluid flow from the blocking side wherein flow passes from the blocking member toward the seating member as well as flow from the open side wherein flow passes from the open channel, seating member and then toward the blocking member, said seating member comprising:

first and second annular disk elements, each having interior perimeters defining annular openings, the first disk element being flexible and having a seating side of its interior perimeter and annular opening adapted in size and configuration to seat against the convex seating surface of the blocking member when in a closed position;

the second disk element having one face in direct contact with a nonseating side of the fist disk element such that deflection of said first disk element in the direction of the second disk element causes an equal deflection of said second disk element, said second disk element having sufficient size and rigidity to reinforce the first disk element against flexing away from sealing contact with the blocking member in response to fluid flow from the blocking side, said second disk element having an annular opening which does not interfere with sealing contact of the first disk element at the blocking member;

the first disk element having sufficient flexibility to permit its interior perimeter to deflect toward the seating surface of the blocking member and away from the second disk element in response to fluid flow from the open side, said open side fluid flow being operable to enhance the sealing contact of the first disk element with the seating surface based on deflection, said blocking side fluid flow being operable to enhance the sealing contact based on absence of deflection of the first element; and means for securing the seating member rigidly within the valve in a projecting orientation with respect to the flow channel for proper seating contact.

2. A valve as defined in claim 1, wherein the first disk element is fabricated of flexible stainless steel.

3. A valve as defined in claim 1, wherein the second disk element is fabricated of flexible stainless steel.

4. A valve as defined in claim 1, further comprising a flexible, annular soft seating member positioned against the seating side of the first disk element toward flow originating from the blocking side, said soft seating member having an annular opening larger than the annular opening of the first disk element and adapted to seat against the convex seating surface, said soft seating member having sufficient flexibility to permit the first disk element to deflect in response to flow from the open channel side of the valve.

5. A valve as defined in claim 1, wherein the second disk element is in direct contact with at least two thirds of the nonseating side of the first disk element.

6. A valve as defined in claim 1, wherein the second disk element is in direct contact with at least 50% of the nonseating side of the first disk element.

7. A valve as defined in claim 1, wherein the second disk element is in direct contact with all of the nonseating side of the first disk element.

8. In a bi-directional valve system, a differential, bi-directional valve seating member for operation at a seating surface, said seating member comprising a multi-member disk formed of at least first and second contiguous disk elements;

said first disk element being formed of flexible material which is capable of primary deformation in response to fluid flow along a flow line direction corresponding to second-to-first disk orientation, said first element being configured in size and shape to increase seating contact at the seating surface by flow-pressure assist with said primary deformation response;

said second disk element being formed of flexible material which when operating in conjunction with the first disk element, the combined result is less capable of deforming than the first disk element and therefore resists the primary deformation response of the first disk element with respect to fluid flow along an opposing flow line from a first-to-second disk element orientation, the deflection of the first disk element being equal to the deflection of the second disk element, seating contact along the first-to-second element orientation being pressure enhanced by reason of slight conventional displacement of the seating surface toward the multi-member disk;

said resistance against primary deformation of the first disk element by the second element providing enhanced seating contact by supporting increased pressure between the seating surface and first disk element with permitting flow pressure to push past the multi-member disk.

9. A valve as defined in claims 1 or 8 wherein said first disk element and said second disk element are of the same size and shape.

10. A valve as defined in claim 9 wherein said first disk element is fabricated of the same type material as the second disk element.

11. A valve as defined in claim 10 wherein said first disk element is fabricated of flexible stainless steel and said second disk element is fabricated of flexible stainless steel.

* * * * *